United States Patent
Baker

(10) Patent No.: US 8,444,045 B2
(45) Date of Patent: *May 21, 2013

(54) JOINING OF PARTS VIA MAGNETIC HEATING OF METAL ALUMINUM POWDERS

(75) Inventor: Ian Baker, Etna, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,710

(22) Filed: May 7, 2012

(65) Prior Publication Data
US 2012/0315493 A1 Dec. 13, 2012

Related U.S. Application Data

(66) Continuation-in-part of application No. 12/993,779, filed as application No. PCT/US2009/044547 on May 19, 2009, now Pat. No. 8,172,126, Substitute for application No. 61/054,380, filed on May 19, 2008.

(51) Int. Cl.
*B23K 31/02* (2006.01)

(52) U.S. Cl.
USPC ..... 228/233.1; 228/102; 228/245; 228/248.1; 228/214; 228/225

(58) Field of Classification Search
USPC ............ 228/102, 245, 248.1, 214, 225, 233.1
See application file for complete search history.

(56) References Cited

U.S. PATENT DOCUMENTS
3,953,056 A * 4/1976 Roberts ........................ 281/29

FOREIGN PATENT DOCUMENTS

| JP | 04037658 A | 2/1992 |
| JP | 06047181 B2 | 5/1994 |
| JP | 2000271605 A | 10/2000 |
| JP | 2000315570 A | 11/2000 |

OTHER PUBLICATIONS

International Search Report and Written Opinion issued in related PCT Patent Application Serial No. PCT/US2009/044547, dated Jan. 19, 2010, 10 pages.
Notice of Allowance issued in related U.S. Appl. No. 12/993,779, dated Feb. 3, 2012, 10 pages.

* cited by examiner

*Primary Examiner* — Erin Saad
(74) *Attorney, Agent, or Firm* — Lathrop & Gage LLP

(57) ABSTRACT

A method of joining at least two parts includes steps of dispersing a joining material comprising a multi-phase magnetic metal-aluminum powder at an interface between the at least two parts to be joined and applying an alternating magnetic field (AMF). The AMF has a magnetic field strength and frequency suitable for inducing magnetic hysteresis losses in the metal-aluminum powder and is applied for a period that raises temperature of the metal-aluminum powder to an exothermic transformation temperature. At the exothermic transformation temperature, the metal-aluminum powder melts and resolidifies as a metal aluminide solid having a non-magnetic configuration.

26 Claims, 18 Drawing Sheets

Fig. 7
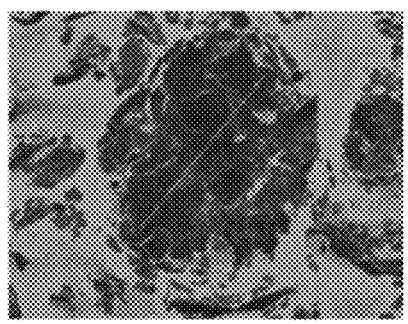
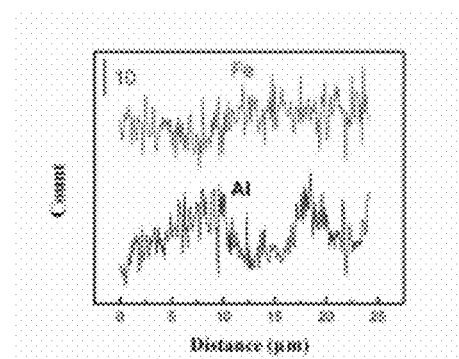
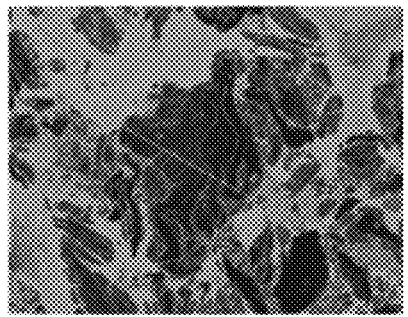
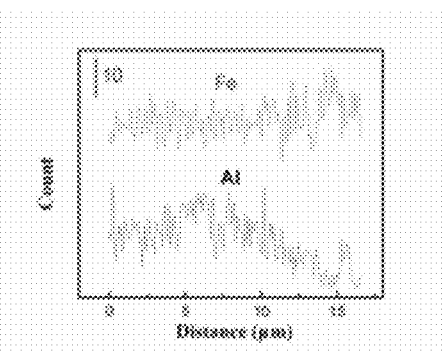

Fig. 8
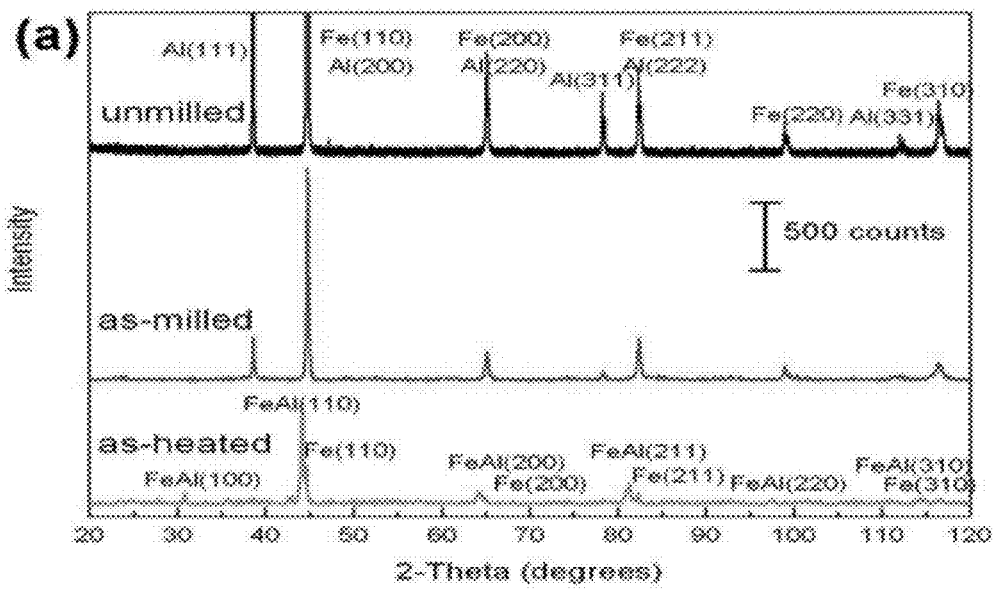
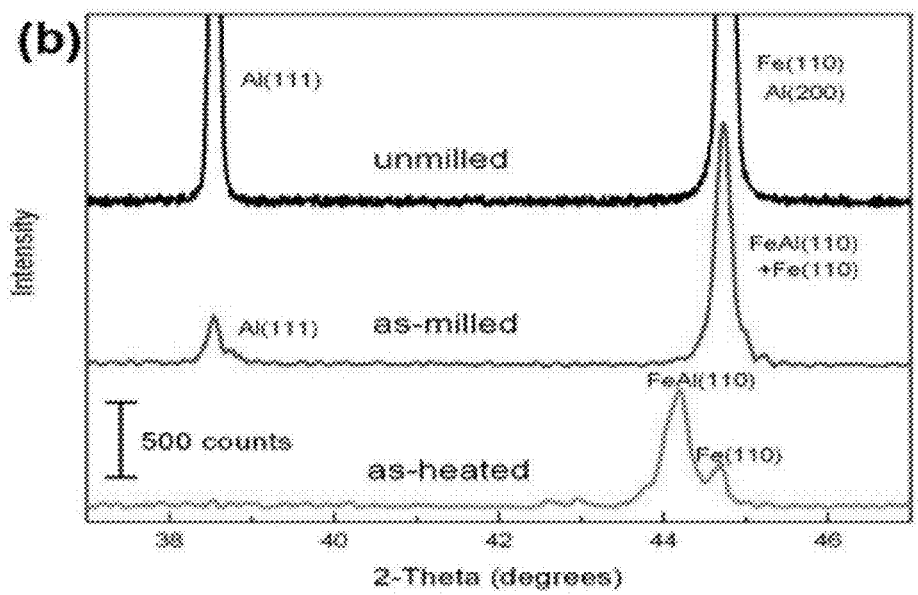

JOINING OF PARTS VIA MAGNETIC HEATING OF METAL ALUMINUM POWDERS

RELATED APPLICATIONS

This application is a Continuation-in-part of U.S. patent application Ser. No. 12/993,779, filed Nov. 19, 2010, which claims the benefit of priority of PCT Application PCT/US2009/044547, filed May 19, 2009, which claims the benefit of priority of U.S. Patent Application Ser. No. 61/054,380, filed May 19, 2008. All of the applications mentioned above are incorporated by reference herein.

GOVERNMENT INTERESTS

This invention was made with government support under DMR-0905229 awarded by the U.S. National Science Foundation (NSF); under DE-FG02-07ER46392 awarded by the Office of Basic Energy Science, U.S. Department of Energy (DOE); and under Contract No. 60NANB2D0120 awarded by the National Institute of Standards and Technology (NIST). The government has certain rights in the invention.

BACKGROUND

1. Field of the Invention

This invention relates to methods of using an alternating magnetic field (AMF) to generate hysteresis losses in multiphase metal-aluminum powders. When the powders are subjected to an AMF of appropriate strength and frequency for a suitable period, an exothermic reaction is triggered, which causes the powders to melt. A metal aluminide, having an ordered crystal structure, solidifies from the melt. The metal aluminide does not exhibit hysteretic behavior and cannot be melted by application of an AMF.

2. Description of the Related Art

The most common techniques for joining parts are soldering, brazing, and welding, which involve heating and liquefying metals or metal alloys at a seam or junction where two or more parts are to be joined. Heat is typically applied by a resistively heated solder gun or an acetylene torch. However, such 'brute force' heating methods often cause heating, not only of the solder or braze, but also of the parts to be joined, which may lead to dimensional distortion and changes in physical and/or mechanical properties.

In an attempt to provide more precise heating, methods of using AMFs to induce a flow of current and/or generate magnetic hysteresis losses within a joining material have been developed. However, each of these mechanisms has practical limitations when applied to conventional joining materials. For example, induction heating requires that a joining material be conductive and arranged to provide a conduction path. For this reason, it is generally not possible to inductively heat powders, which may be physically separated and/or coated with a surface oxide that prevents current flow between particles.

On the other hand, when heating via magnetic hysteresis losses the maximum achievable temperature is the Curie temperature of the magnetic material. Typically, the maximum achievable temperature (Curie temperature) is sufficient to melt polymeric materials, but not metals. Further, bonds formed between parts may be weakened by exposure to extraneous magnetic fields that can cause unintended reheating of the joining material.

Metal oxide particles dispersed within a polymer matrix represent one example of a known system that provides joining of parts via magnetic hysteresis losses. However, metal oxide systems suffer from the disadvantages discussed above, namely: (1) the Curie temperature of the metal oxide represents a maximum achievable temperature; (2) the matrix (polymer) material must have a melting point that is less than or equal to the Curie temperature of the metal oxide, which is typically between about 100 to 600° C.; (3) the metal oxide particles remain ferromagnetic within the resolidified polymer allowing the polymer to reheat and melt if subjected to another AMF; and (4) polymer bonds are typically weaker than metal or alloy bonds.

Another approach to obtaining precise heating involves the use of Ni—Al multilayer foils, which are deposited by thin film deposition techniques, between parts to be joined. The Ni—Al foils are ignited by a flame or electrical impulse. Following ignition, a nickel aluminide (NiAl) compound having an ordered B2 structure solidifies and bonds the parts together. This process provides precise heating and rapid bond formation. However, it is expensive to perform thin film deposition, and the use of thin film deposition generally limits the parts to be joined to those having planar surfaces.

SUMMARY

The present disclosure provides methods of joining at least two parts and products prepared using the disclosed methods. In one embodiment, the disclosed method may include steps of dispersing a joining material containing a metal-aluminum powder at an interface between the at least two parts to be joined and applying an alternating magnetic field (AMF). The AMF has a magnetic field strength and frequency suitable for inducing magnetic hysteresis losses in the metal-aluminum powder and is applied for a period that raises temperature of the metal-aluminum powder to an exothermic transformation temperature. At the exothermic transformation temperature, the metal-aluminum powder melts and resolidifies as a metal aluminide solid having a non-magnetic configuration. In one embodiment, the metal-aluminum powder may contain regions of crystallinity having micrometer scale dimensions, e.g., 10-100 µm or less. In another embodiment, the metal-aluminum powder may contain regions of crystallinity having nanometer scale dimensions, e.g., 10-100 nm or less.

BRIEF DESCRIPTION OF THE DRAWINGS

FIG. 7 shows BSE images of the microstructure and X-ray spectra from the sample that was milled for 2 h and heated in an AMF of 160 Oe at 400 kHz for 60 s. The scale bar in the spectra indicates 10 counts.

FIG. 8 shows (a) XRD patterns of the powders in different states; (b) section of the patterns in (a) enlarged around the Al (111) and Fe (110)/Al (200) peaks.

DETAILED DESCRIPTION

Figure 1A:
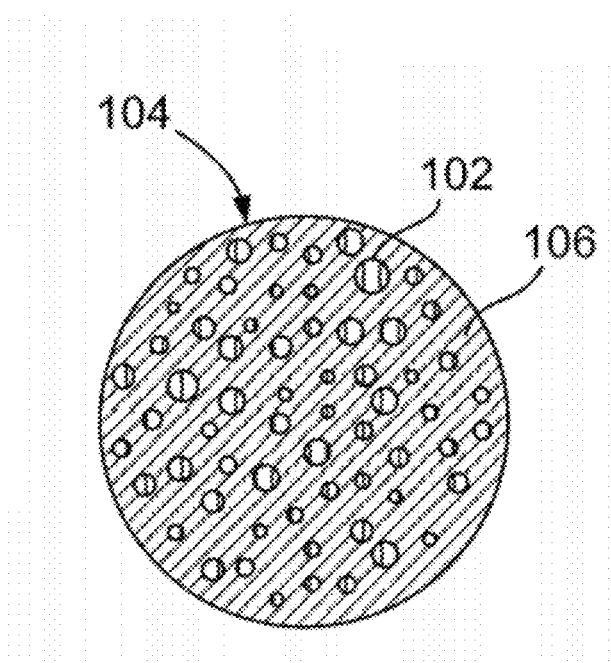
FIGS. 1A and 1B illustrate cross-sectional views of two exemplary metal-aluminum particles, according to an embodiment.

"Microcrystalline" material contains regions of crystallinity having micrometer scale dimensions, e.g., 100 micrometers or less. In one aspect, the microcrystalline material may contain non-crystalline (amorphous) regions in addition to one or more crystal domains. In another aspect, the microcrystalline material may be a completely crystalline material containing a plurality of crystal domains.

"Nanocrystalline" material contains regions of crystallinity having nanometer scale dimensions, e.g., 100 nanometers or less. In one aspect, the nanocrystalline material may contain non-crystalline (amorphous) regions in addition to one or more crystal domains. In another aspect, the nanocrystalline material may be a completely crystalline material comprising a plurality of crystal domains.

The term "intermetallic compound" refers to a compound containing at least two different metals.

As used herein, the formula M-Al refers to metal-aluminum particles containing a metal, M, and aluminum, Al, where the particles contain a microcrystalline arrangement of atoms. When the formula is written as (x)M-(y)Al, (x) and (y) represent concentrations of metal and aluminum in terms of atomic percent, respectively. The formula MAl refers to a metal aluminide having a metal, M, and aluminum, Al, arranged in a substantially ordered crystal structure.

"Induction heating" refers to heating of an electrically conductive material by eddy currents induced by a varying electromagnetic field. As discussed above, powders are generally not suitable for induction heating.

"Magnetic hysteresis loss" refers to energy lost as heat when the magnetization of a material is reversed in response to a varying electromagnetic field.

As used herein, a "non-magnetic" material does not exhibit significant hysteretic behavior in the presence of an alternating magnetic field, significant hysteretic behavior being characterized by a coercivity of 12.5 Oe or more. For example, diamagnetic materials, paramagnetic materials and antiferromagnetic materials are examples of "non-magnetic" materials, according to the present disclosure.

A "non-magnetic structure" or "non-magnetic configuration" is an arrangement of atoms, and paired electrons, that prevents significant hysteretic behavior.

On the other hand, a "magnetic" material exhibits significant hysteretic behavior in the presence of an alternating magnetic field, significant hysteretic behavior being characterized by a coercivity of 12.5 Oe or more. For example, ferromagnetic materials and ferrimagnetic materials are examples of "magnetic" materials, according to the present disclosure.

It has recently been demonstrated that when elemental powders of Fe and Al (40 at. %) of size 5-10 μm are milled for a short period (1-2 h) they produce particles having a microcrystalline structure. The disordered atoms within the particles lead to ferromagnetic behavior and susceptibility to heating in an AMF. At 400° C., the particles undergo a phase transformation with a substantial heat output of about 175-200 J/g. (Q. Zeng and I. Baker, "Magnetic Properties and Thermal Ordering of Mechanically Alloyed Fe-40 at. % Al", *Intermetallics,* 14 (2006) 396-405.)

Without being bound by theory, it is believed that this heat output may arise from the reaction of nanocrystalline and/or microcrystalline regions of Fe and Al, present in the milled powders, forming an ordered FeAl intermetallic compound. In particular, the heat of transformation from the reaction between Fe and Al to form B2-structured FeAl is 694 J/g (30.8 kJ/mol) for Fe-40 at. % Al and 874 J/g (36.3 kJ/mol) for Fe-50 at. % Al. (J. Breuer, A. Grun, F. Sommer and E. J. Mittemeijer, Metallurgical and Materials Transactions B, 32B, 913.)

Figure 1B:
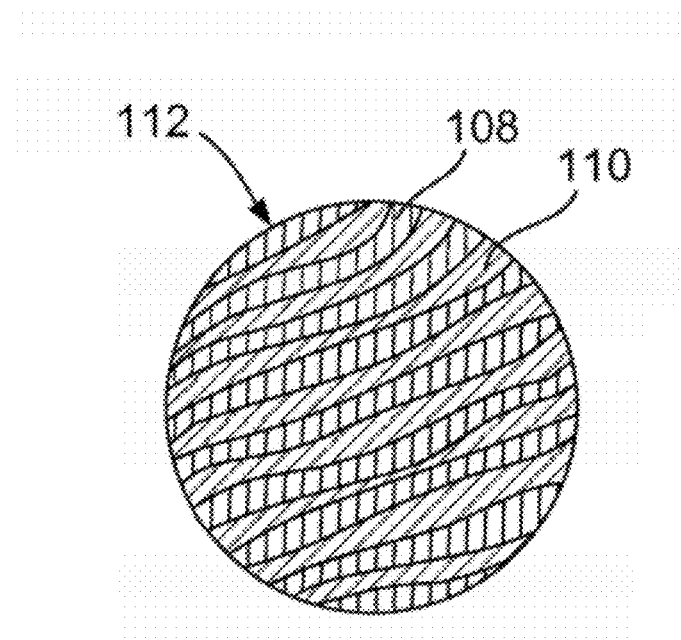

FIGS. 1A and 1B illustrate cross-sectional views of two exemplary metal-aluminum particles. In FIG. 1A, a first metal 102, e.g., Al, is randomly distributed throughout a particle 104 that is predominantly composed of a second metal 106, e.g., Fe. It will be appreciated that first and second metals 102, 106 may be interchanged and that more than two metals may be present in a single particle 104. In FIG. 1B, a first metal 108 and a second metal 110 are shown as forming layers within a particle 112. Again, more than two metals 108, 110 may be present in a single particle 112 having a layered configuration. Other configurations, which are not illustrated, are also possible.

When the elemental powders of Fe and Al (40 at. %) of size 5-10 μm are milled for longer times (>10 h), disordered b.c.c. Fe—Al is formed, which produces a small heat output at ~180-200° C. of ~20 J/g due to an ordering reaction that forms B2-structured FeAl.

Methods of utilizing magnetic metal-aluminum powders, of the type described above, and the associated heat output from one or more exothermic transformations, to join parts are disclosed herein. Nanocrystalline or microcrystalline magnetic metal-aluminum powders may be produced, for example, by the mechanical alloying/milling technique described by Zeng and Baker, or by other known techniques, such as inert gas condensation, severe plastic deformation, plasma processing, and laser ablation. Generally, the nanocrystalline or microcrystalline particles useful in the present methods have diameters between 1 μm and 25 μm or between 5 μm and 10 μm.

Figure 2:
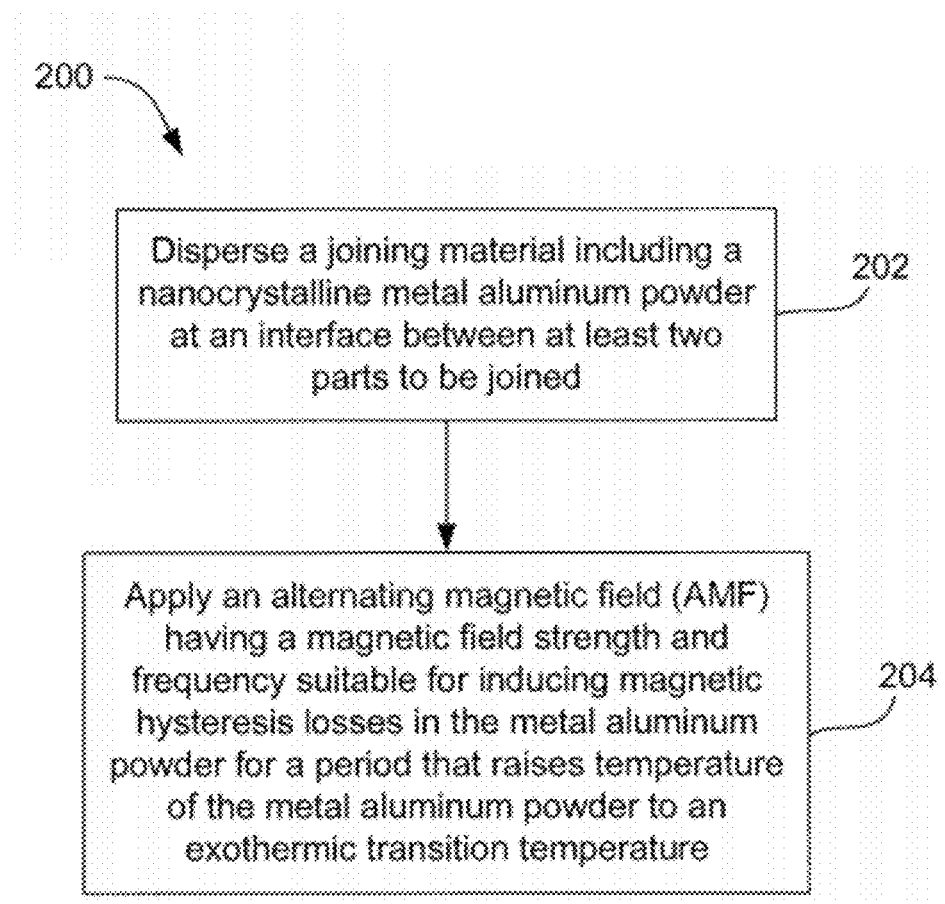
FIG. 2 is a flowchart illustrating steps for an exemplary method of joining at least two parts, according to an embodiment.
Figure 3:
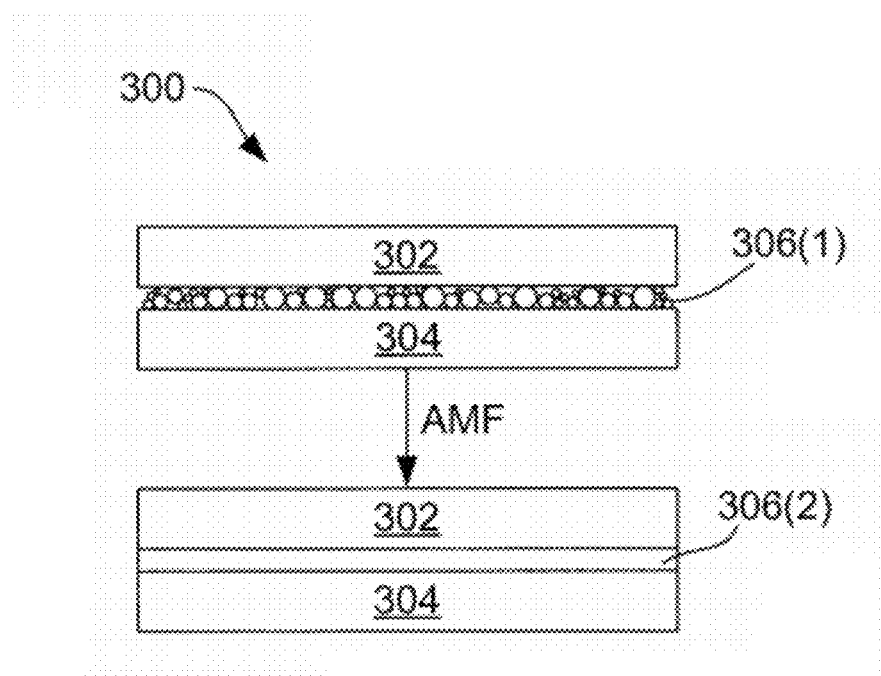
FIG. 3 depicts two parts being joined in accordance with the method of FIG. 2.

In one example of a method for joining two or more parts, illustrated in flowchart 200 of FIG. 2 and schematic 300 of FIG. 3, metal-aluminum powder 306(1) is dispersed at an interface between two or more parts 302, 304 to be joined. See step 202. An AMF having a magnetic field strength and frequency suitable for inducing magnetic hysteresis losses in metal-aluminum powder 306(1) is applied, in step 204, for a period that raises the temperature of metal-aluminum powder 306(1) to an exothermic transformation temperature. For example, an AMF of 210 Oe having a frequency of 250 KHz produces a heating rate of 15° C./s for nanocrystalline or microcrystalline Fe-40Al. Metal-aluminum powder 306(1) reaches 400° C. in about 25 s and undergoes an exothermic transformation that causes melting of the powder. Upon resolidification, a solid metal aluminide 306(2) having an ordered B2 structure is formed. Metal aluminides having the B2 structure are non-magnetic, so further heating by an AMF does not occur to a significant amount.

Generally, AMFs suitable for use in the present methods will have magnetic field strengths between 50 Oe and 2000 Oe, or between 100 Oe and 1000 Oe, or between 150 Oe and 500 Oe, or between 200 Oe and 300 Oe, as well as frequencies between 25 KHz and 100 MHz, or between 50 KHz and 1 MHz, or between 100 KHz and 500 KHz. The AMF is typically applied to the joining material for a period between 5 seconds and 100 seconds, or between 10 seconds and 60 seconds, or between 15 seconds and 35 seconds, or between 20 seconds and 30 seconds.

The disclosed methods may involve various types of nanocrystalline or microcrystalline metal-aluminum powders, in which one or more of the metals, M, is magnetic, e.g. iron, nickel or cobalt. For example, the metal-aluminum may include one or more metals, M, for the formation of a metal aluminide selected from the group consisting of iron aluminide, nickel aluminide, cobalt aluminide, ternary intermetallic compounds comprising Al and two metals selected from Fe, Ni and Co, quaternary intermetallic compounds comprising Fe, Ni, Co and Al, and physical mixtures thereof. In one example, Breuer et al. showed that a large heat output may be gained if Ni is partially substituted for Fe or Al in Fe-40Al.

Magnetic metal-aluminum powders, where M represents one or more metals, containing between 55 and 80 atomic percent M and between 20 and 45 atomic percent Al; or between 55 and 65 atomic percent M and between 35 and 45 atomic percent Al; or between 57 and 63 atomic percent M and between 37 and 43 atomic percent Al, may be used in the present methods.

The exothermic transformation temperature of the metal-aluminum powder may be controlled by varying the chemical composition of the powder and/or by creating physical mixtures of metal-aluminum powders. For example, Fe-40Al may be doped with Ni, as disclosed by Breuer et al., to affect a chemical change that yields a ternary intermetallic compound, whereas Fe-40Al may be mixed with Ni-40Al to create a physical mixture of two binary intermetallic compounds.

Various parts may be joined by the methods disclosed herein. For example, a ceramic, a metal, a semiconductor, or a polymer may be joined with one or more parts selected from ceramics, metals, semiconductors and polymers, e.g., polymer-polymer, semiconductor-semiconductor, ceramic-ceramic, polymer-metal, polymer-semiconductor, polymer-ceramic, metal-semiconductor, metal-ceramic and semiconductor-ceramic combinations are possible.

When joining a metal part to a non-metallic part, the AMF must be applied from the non-metallic side since the metal will both be heated by eddy current heating and block the AMF from reaching the interface. In applying an AMF from the non-metallic side, a higher frequency is better since the skin penetration depth of an AMF decreases as the negative square root of the frequency. At 1 MHz, the skin penetration depth is about 66 μm, which is of the order of the thickness of the joining material at the interface.

In an exemplary method of joining parts, a joining material containing magnetic metal-aluminum particles may be dispersed at an interface of two or more parts to be joined. In the presence of an applied AMF having a suitable magnetic field strength and frequency, the metal-aluminum undergoes an exothermic phase transformation which melts the powder. A bond is formed between the two or more parts when the resulting metal aluminide resolidifies.

In another exemplary method of joining parts, magnetic metal-aluminum particles may be dispersed at an interface between parts, or as an integral portion of one or more parts, having a melting point that is less than or equal to the exothermic transformation temperature of the metal-aluminum powder. Upon application of an AMF, a portion of the part(s) in thermal contact with the metal-aluminum melts at or below the exothermic transformation temperature of the metal-aluminum and contributes to bonding of the parts. The part(s) may, for example, be fabricated from a polymer or mixture of polymers having a melting point of about 400° C. or less, for example.

In another exemplary method of joining parts, magnetic metal-aluminum particles may be dispersed within a prefabricated article that is manufactured from a material having a melting point that is less than or equal to the exothermic transformation temperature of the metal-aluminum powder. In one example, the prefabricated article may be sized and shaped in accordance with specific parts to be joined. For example, a prefabricated ring may be placed between two pipes to be joined. Upon application of an AMF, a portion of the material in thermal contact with the metal-aluminum melts at or below the exothermic transformation temperature of the metal-aluminum and contributes to bonding of the parts.

In another example, the prefabricated article containing the metal-aluminum particles may be formed as a tape having an adhesive on one or both surfaces. The tape may be positioned between two or more parts to be joined and the adhesive may temporarily hold the tape in place. Application of an AMF having a suitable magnetic strength and frequency causes a portion of the tape material in thermal contact with the metal-aluminum to melt at or below the exothermic transformation temperature and contribute to formation of a permanent bond between the parts. Suitable tape and adhesive materials are known in the art.

In another exemplary method of joining parts, magnetic metal-aluminum particles may be dispersed with a solder having a melting point that is less than or equal to the exothermic transformation temperature of the metal-aluminum powder. If the melting point of the solder is less than the exothermic transformation temperature, application of an AMF causes the solder alone to melt and form a bond between the parts. On the other hand, if the melting point of the solder is equal to the exothermic transformation temperature of the metal-aluminum, application of an AMF causes the solder and metal-aluminum to melt concurrently and both contribute to bonding of the parts.

A solder or braze (a.k.a., hard solder) is a fusible metal alloy. Solder typically has a melting point or melting range between 90 to 450° C., and more typically between 180 and 190° C. Lead-free solders in commercial use may contain tin, copper, silver, bismuth, indium, zinc, antimony and traces of other metals. Hard solder, used for brazing, is generally a copper/zinc or copper/silver alloy that melts above 450° C.

In another exemplary method of joining parts, magnetic metal-aluminum powder may be dispersed with a solvent and binder to form a slurry. The slurry may be "painted" or silk-screen printed onto a surface of a part, or the part may be dipped into the slurry. Depending on the solubility of the binder, the solvent, which may be present in any suitable amount such as up to about 5 wt %, may be aqueous or non-aqueous. The binder may, for example, be blended with the metal-aluminum powder in an amount such as up to about 5 wt. %. Solvents and binders within a slurry may evaporate or burn off (i.e., decompose) prior to or during heating, or the binder may remain unaffected by heating in the range of the exothermic transformation temperature.

In an embodiment, metal-aluminum powder may be applied to a surface of a part as a slurry. Solvent may evaporate before the part is contacted with a second part to which it will be joined. Application of an AMF melts the metal-aluminum powder, but leaves the binder unchanged. The metal aluminide solid formed by this method is free of bubbles, which might otherwise form during loss of solvent or gaseous decomposition products from a melt. Void spaces (bubbles) are known to weaken the structural integrity of solids, and are advantageously avoided.

Suitable binders that are soluble in non-aqueous solvent include cellulose, methyl cellulose, ethyl cellulose, carboxymethylcellulose, cellulose acetate-butyrate, nitrocellulose, paraffin, petroleum resins, polyethylene, polyacrylate esters, poly methyl-methacrylate, polyvinyl alcohol, polyvinyl butyral, polyvinyl chloride, vinyl chloride-acetate, polytetrafluoroethylene, poly-α-methyl styrene and combinations thereof.

Suitable non-aqueous solvents include but are not limited to acetone, methyl ethyl ketone, methyl isobutyl ketone, cyclohexanone, alcohols (e.g., methanol, ethanol, isopropanol, butanol), benzene, toluene, xylene, carbon tetrachloride, bromochloromethane, diacetone, trichloroethylene, tetrachloroethylene and combinations thereof.

Binders that are soluble in aqueous solvent (e.g., water) include but are not limited to acrylic polymer, acrylic polymer emulsion, ethylene oxide polymer, hydroxy ethyl cellulose, methyl cellulose, polyvinyl alcohol, tris isocyaminate, wax emulsions, acrylic copolymer latex, polyurethane, polyvinyl acetate dispersion and combinations thereof.

The following examples set forth methods for joining two or more parts by inducing magnetic hysteresis losses in magnetic metal-aluminum powders. These examples teach by way of illustration, not by limitation, and should not be interpreted as unduly narrow.

EXAMPLE 1

Joining of Two or More Parts Via Magnetic Heating of Metal-Aluminum Powders

Magnetic metal-aluminum powders are used in the present method for joining two or more parts. The metal-aluminum powders may be produced, for example, by the mechanical alloying/milling technique described by Zeng and Baker, or by other known techniques, such as inert gas condensation, severe plastic deformation, plasma processing and laser ablation. Those skilled in the art may select an appropriate process based on, for example, available resources, production scale and processing costs.

The magnetic metal-aluminum powder is dispersed at an interface between two or more parts to be joined. The powder may be used alone, or applied in the form of a slurry, which contains a solvent and binder.

The powder is heated by applying an AMF. For example, an AMF of 210 Oe having a frequency of 250 KHz produces a heating rate of 15° C.·s$^{-1}$ for Fe-40Al. The powder reaches 400° C. in about 25 s and undergoes an exothermic transformation that causes melting of the powder. Upon resolidification, the iron aluminide solid adopts a B2 structure, which is non-magnetic. Thus, a bond that is formed by this process will not remelt upon subsequent application of an AMF.

EXAMPLE 2

Joining of Parts Having Low Melting Points

Joining of parts by magnetic heating of magnetic metal-aluminum powders may be performed when one or more of the parts is manufactured from a material having a melting point less than or equal to the exothermic transformation temperature of the metal-aluminum. In such a case, a portion of the part(s) will melt, either before or with the metal-aluminum powder, and contribute to bonding.

The metal-aluminum powder may be dispersed at the interface of two or more parts, at least one of which has a low melting point, and the method generally described in Example 1 may be used to heat the metal-aluminum powder. If the melting point of the part(s) is less than the exothermic transformation temperature of the metal-aluminum, a portion of the part(s) in thermal contact with the metal-aluminum melts and forms a bond at a temperature below the exothermic transformation temperature. The metal-aluminum powder retains its physical and magnetic characteristics, and is susceptible to heating by a subsequently applied AMF.

On the other hand, if the melting point of the part(s) is equal to the exothermic transformation temperature of the metal-aluminum, a portion of the part(s) in thermal contact with the metal-aluminum will melt concurrently with the metal-aluminum powder, and both the melted portion of the part and the metal aluminide will contribute to bonding.

In one embodiment, the magnetic metal-aluminum powder may be integrated into the part(s). For example, a region of the part(s) at the interface that is approximately one centimeter or less in thickness may be impregnated with magnetic metal-aluminum powder, which causes the region to melt in the presence of an applied AMF.

EXAMPLE 3

Metal-Aluminum Powder Dispersed with Solder/Braze

Joining of parts by magnetic heating of magnetic metal-aluminum powders may be performed when solder is dispersed with magnetic metal-aluminum powder at the interface of two or more parts to be joined. The solder may have a melting point that is less than or equal to the exothermic transformation temperature of the metal-aluminum.

If the melting point of the solder is less than the exothermic transformation temperature of the metal-aluminum, the solder that is in thermal contact with the metal-aluminum will melt and form a bond at a temperature below the exothermic transformation temperature. The metal-aluminum powder retains its physical and magnetic characteristics, and is susceptible to heating by a subsequently applied AMF.

On the other hand, if the melting point of the solder is equal to the exothermic transformation temperature of the metal-aluminum, the solder that is in thermal contact with the metal-aluminum will melt concurrently with the metal-aluminum powder, and both the solder and the metal aluminide will contribute to bonding.

EXAMPLE 4

Magnetically-Triggered Heating of Fe—Al Powders

Alloy powders with nominal composition Fe-40 at % Al were prepared by mechanical milling using a water-cooled Union Process Szegvari attritor at a rotation speed of about 400 rpm using 4.76 mm dia. 440C ultra-hard wear-resistant stainless steel spherical balls under an Ar atmosphere. Elemental powders with a purity of 99% and a particle size of less than 10 mm were used. The ball-to-powder ratio was 10:1. Heating tests of as-milled powders were performed in a home-built AMF heating system, in which both the frequency and magnetic peak field strength are controllable. The test system is described in detail in Baker et al., J Appl Phys 2006; 99.08H106. A temperature recording system utilizing a fiber optic probe (temperature range: 0-295° C.) was set up for estimating the heating efficiency of the powders.

The phases present in the as-milled and as-heated powders were determined using a Rigaku D/Max 500 X-ray diffractometer (XRD) utilizing Cu $K_\alpha$ radiation operated at 40 kV and 40 mA. Measurements were performed by step scanning 2θ from 10° to 120° with a 0.02° step size. A count time of 1 s per step was used, giving a total scan time of ~1.5 h. The diffraction peak angles, θ, for the heated FeAl were measured using the Rigaku's Jade 5 software package and the best value of the lattice parameter, $a_o$, was determined by plotting the lattice parameters calculated from each of the peaks, a, against the Nelson-Riley (N-R) function, $½(cos^2θ/sin θ+cos^2 θ/θ)$, and extrapolating to N–R=0.

The microstructures and phase compositions were characterized using a FEI XL-30 field emission scanning electron microscope (SEM), equipped with an EDAX Li-drifted energy dispersive X-ray spectrometer (EDS). Both milled and heated powders were not only fixed on a cylindrical holder using conductive tape to examine their morphologies, but also mounted in a phenolic resin and polished to a mirror finish using 0.05 μm alumina powder for microstructural characterization.

The oxygen content of the powders after milling and after annealing was determined using a LECO TC500. The carbon, hydrogen and nitrogen contents of the powders after milling and after annealing were determined using a Perkin-Elmer 2400 Elemental Analyzer by Intertek QTI (Whitehouse, N.J.).

The thermodynamic behavior was investigated using a Perkin Elmer DSC 7 differential scanning calorimeter (DSC), by heating from room temperature to 700° C. at a variety of heating rates under flowing argon. The quasi-static magnetic properties of the powders before and after heating in an AMF were characterized using a Lakeshore model 7300 vibrating sample magnetometer (VSM). The magnetic behaviors of the as-milled powders at different frequencies were examined using a B-H loop tracer (Shb Instrument Inc.). The B-H loops were collected over a range from −200 Oe to 200 Oe at frequencies of 0.1-10 Hz.

Figure 4:
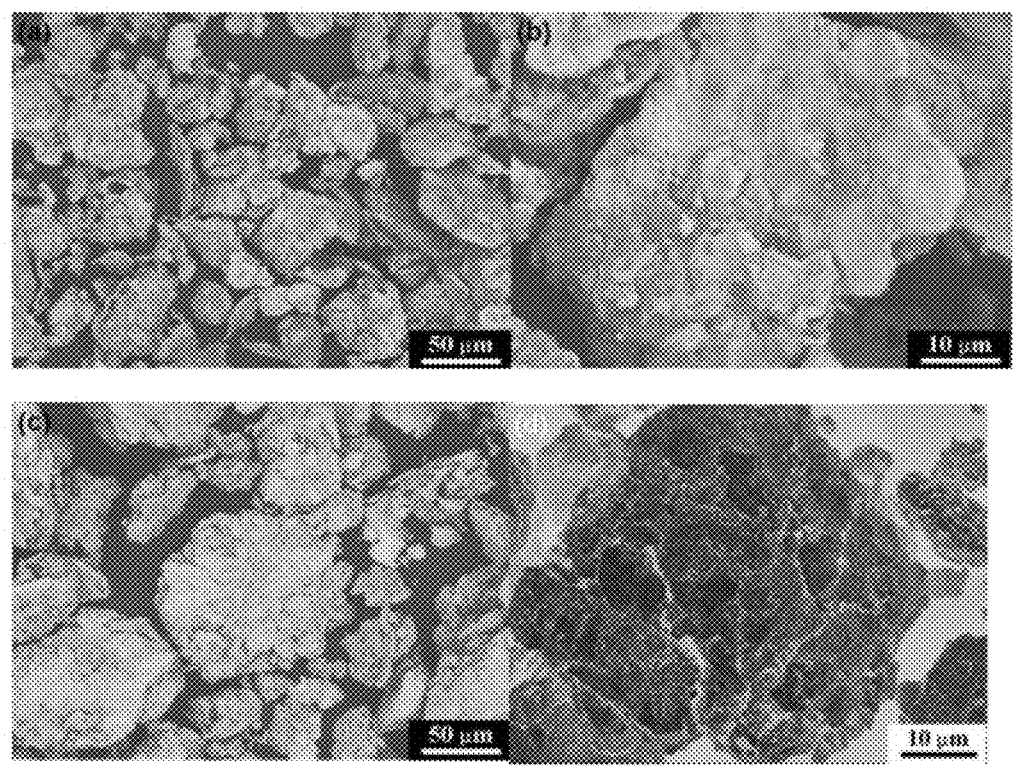
FIG. 4 shows the secondary electron images of the milled powder particles (a and b) before and (c and d) after heating in an AMF of 160 Oe at 400 kHz for 60 s.

The morphologies of the powder particles before and after heating in an AMF with field strength of 160 Oe at a frequency of 400 kHz for 60 s are shown in FIG. 4. Flake-like particles were observed in un-heated powders, a typical feature of ball-milled powder, see FIGS. 4a and 4b. After heating in the AMF, the particle size increased significantly and the particles became roughly spherical due to the agglomeration of the small flake-like particles (FIG. 4d). This may be attributed to the reaction and melting between particles during heating.

Figure 5:
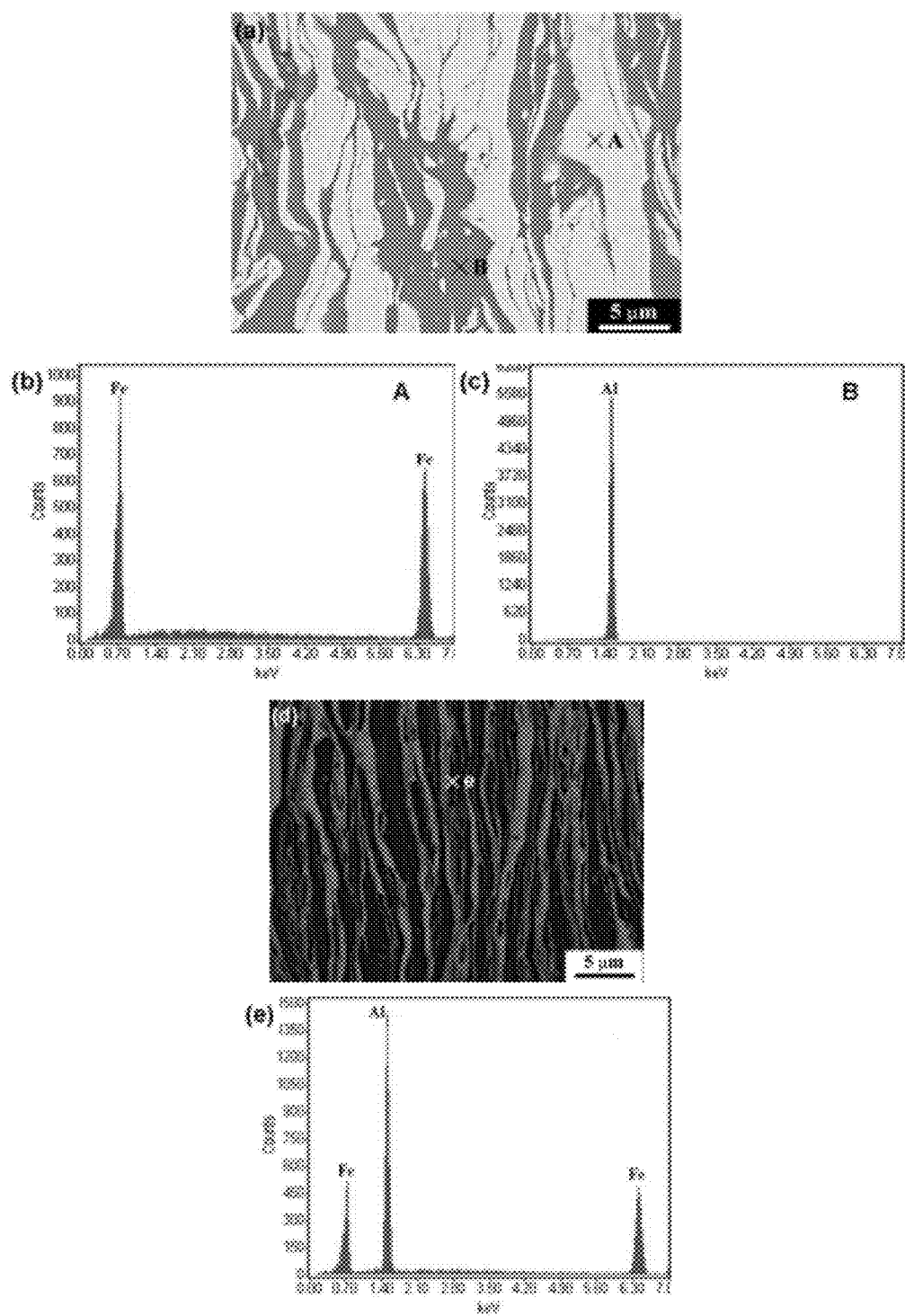
FIG. 5 shows BSE images of the microstructures and X-ray spectra from the phases in powders milled for 1 h (a, b, and c) and 2 h (d and e).

Backscattered electron (BSE) images of the powders and X-ray spectra from the phases present after milling for different times are shown in FIG. 5. After 1 h milling, an intermixed microstructure composed of white areas and grey areas (FIG. 5a), which are Fe and Al respectively, as determined by EDS (FIGS. 5b and c), is present. The microstructure of the as-milled powders becomes finer and more homogeneous after increasing the milling time from 1 h to 2 h, as shown in FIG. 5d. Both Fe and Al were detected in the intermixed region (FIG. 5e). No other elements were detected. These results are consistent with previous observations on ball-milled Fe—Al powders where only Fe and Al peaks were detected after milling times of up to 10 h. In that study, after milling times of 40 h X-ray spectroscopy showed the presence of Mn and Cr contamination. Although no oxygen peak was evident in the X-ray spectra, the LECO analysis showed oxygen at levels of ~1.9 at. %. In contrast, analysis using the Perkin-Elmer 2400 Elemental Analyzer showed only very low levels (in at. %) of C (<0.1%), H (<0.1%) and N (0.07%) were present.

Figure 6:
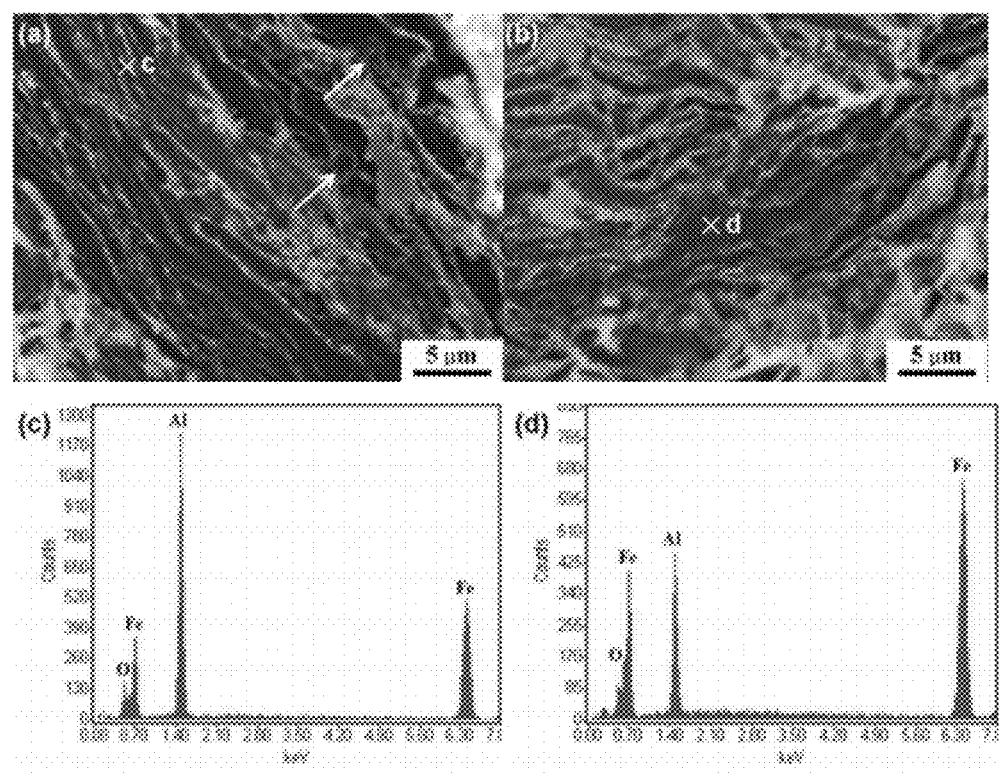
FIG. 6 shows BSE images of the microstructure (a and b) and X-ray spectra (c and d) from the powders heated for 60 s in an AMF at 160 Oe at 400 kHz. The arrows signify the occurrence of local melting.

BSE images and X-ray spectra from the heated powders are shown in FIG. 6. It is notable that the interfaces between the Fe and Al became indistinct, and local melting can be observed in the matrix (as arrowed in FIG. 6a). The X-ray spectra from all points sampled showed both Fe and Al peaks showing that the Fe and Al had reacted. There were differences in Fe:Al X-ray peak height ratios from different points suggesting that the chemistry was not uniform, but such differences could also arise from topographic differences. EDS lines scans also suggested some differences in the local chemistry, see FIG. 7.

In contrast to the results from the as-milled powders, the X-ray spectra from the heated powders showed clear oxygen peaks. LECO analysis showed increased oxygen level compared to the as-milled powders, of ~4.4%. However, analysis using the Perkin-Elmer 2400 Elemental Analyzer showed again showed low levels (in at. %) of C (0.12%), H (0.11%) and N (0.11%).

FIG. 8 shows XRD patterns of the powders in three different states, i.e. unmilled, as-milled, and after heating. In the unmilled powders, the Al (200), (220), (222) peaks overlap with the Fe (110), (200), (211) peaks, respectively. Both Fe and Al peaks are still clearly observable, and the strongest Fe (110) peak broadens and shifts to a slightly lower angle after 2 h milling (see in FIG. 8b), implying the presence of some Fe—Al body-centered cubic (b.c.c.) solid solution. In addition, the small Al peak corresponds to the remnant Al after alloying with Fe. After heating in the AMF, the Al peaks are completely absent, and the Fe/FeAl peaks move to slightly lower angles, indicating the formation of FeAl. The FeAl (100) superlattice peak corresponding to B2 ordering and a few Fe peaks corresponding to residual Fe phase were observed in the as-heated powders, suggesting that the average composition of the FeAl was >40 at. % Al. The lattice parameter of the heated FeAl, as determined from a Nelson-Riley function plot, was 0.2893 nm. This is within the range (0.2890-0.2898 nm) of the literature values of the lattice parameter for Fe-40Al, which depend on heat treatment.

Figure 9A:
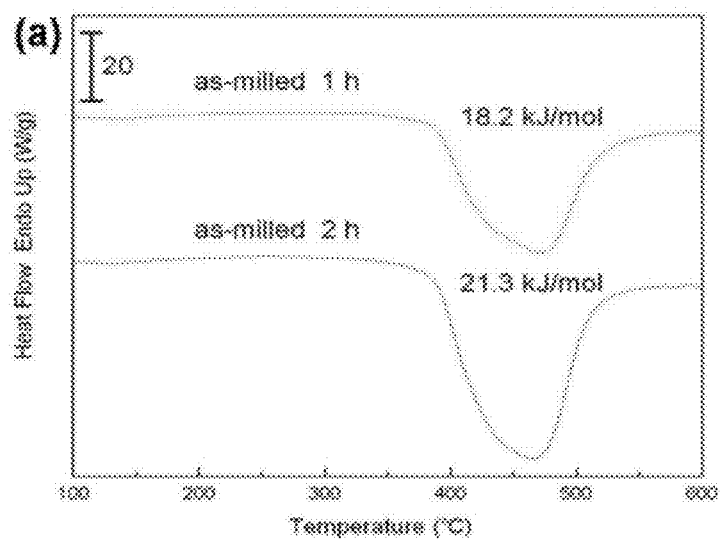
FIG. 9 shows DSC curves of the powders milled for different times (a) and the as-heated powders (b) at a heating rate of 40° C./min.
Figure 9B:
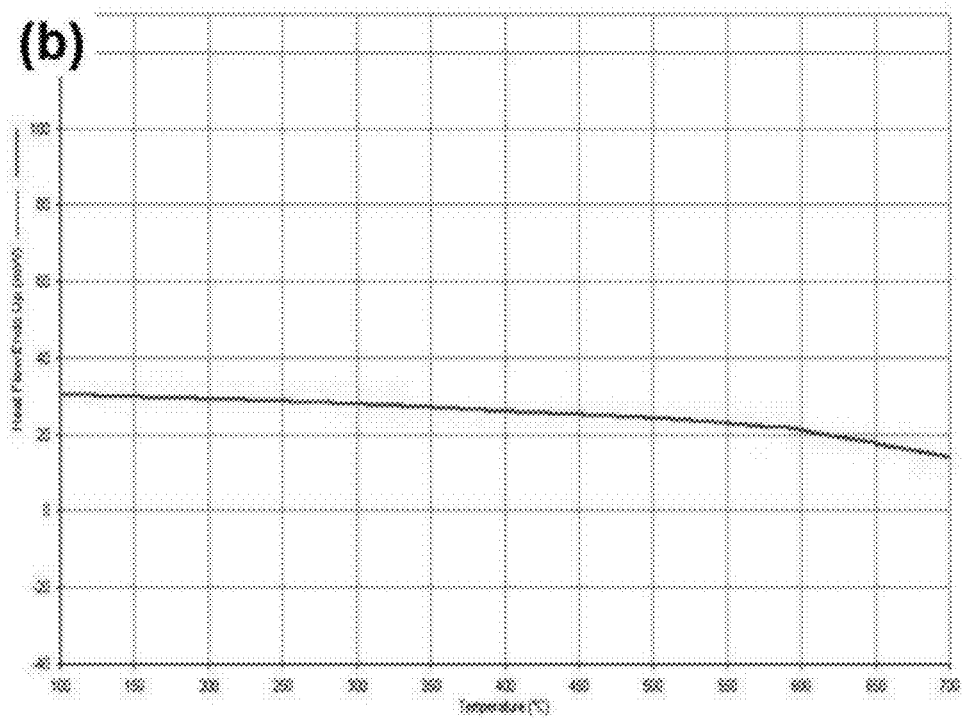

DSC curves of the powders milled for different times at a heating rate of 40° C./min are shown in FIG. 9a. The DSC curves exhibit a broad exothermic peak at temperatures between 380° C. and 530° C. that originates from the formation of B2-structured FeAl compound, a feature in accordance with the observations of Zeng and Baker. The measured enthalpies (~18 kJ mol$^{-1}$ after 1 h milling; ~21 kJ mol$^{-1}$ after 2 h milling) are similar to the enthalpy of formation for B2 FeAl phase (19.9±2 kJ mol$^{-1}$) at a composition of Fe-40 at % Al. The exothermic peak is not observed upon heating the unmilled powders because these powders lack sufficient interfaces between them to react. Note that the energy associated with the exothermic peak increases slightly with an increase in the milling time from one to two hours, a feature attributed to the formation of more Fe—Al atomic interfaces and further homogenization of the microstructure. This is consistent with the SEM observations and X-ray spectra (FIG. 5). In contrast, a DSC run on the as-heated powders exhibits a smooth trace without any exothermic peak (FIG. 9b), implying that the reaction between the Fe and Al has already been completed after heating in the AMF, consistent with the SEM observations (FIGS. 4c and d).

Figure 10A:
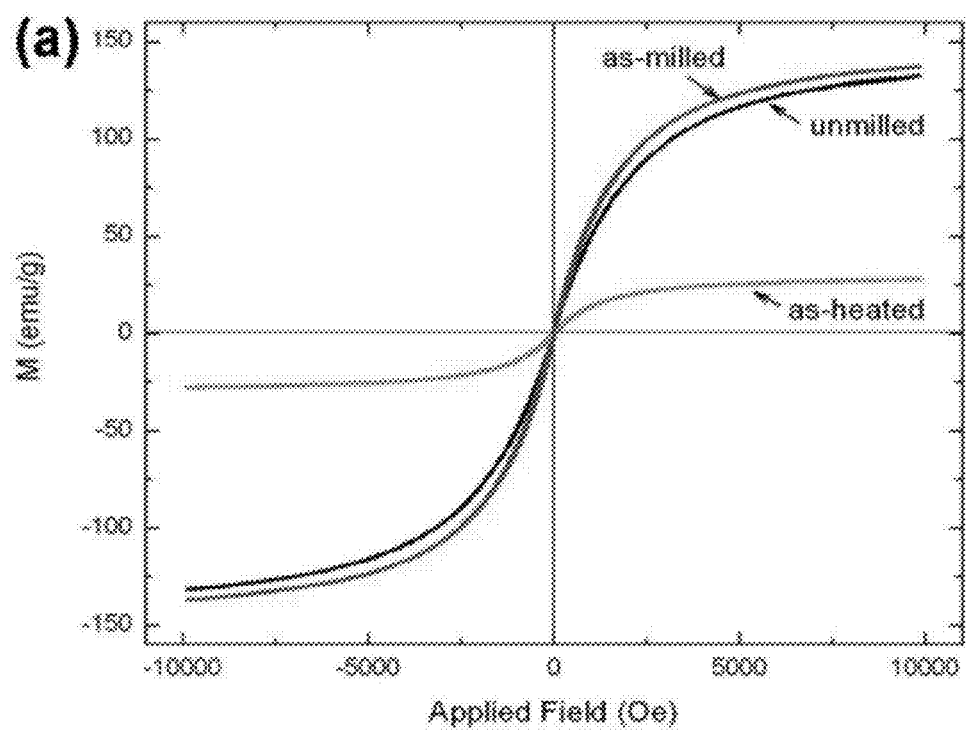
FIG. 10 shows (a) Hysteresis loops of the powders in various states; (b) inner area of loops enlarged.
Figure 10B:
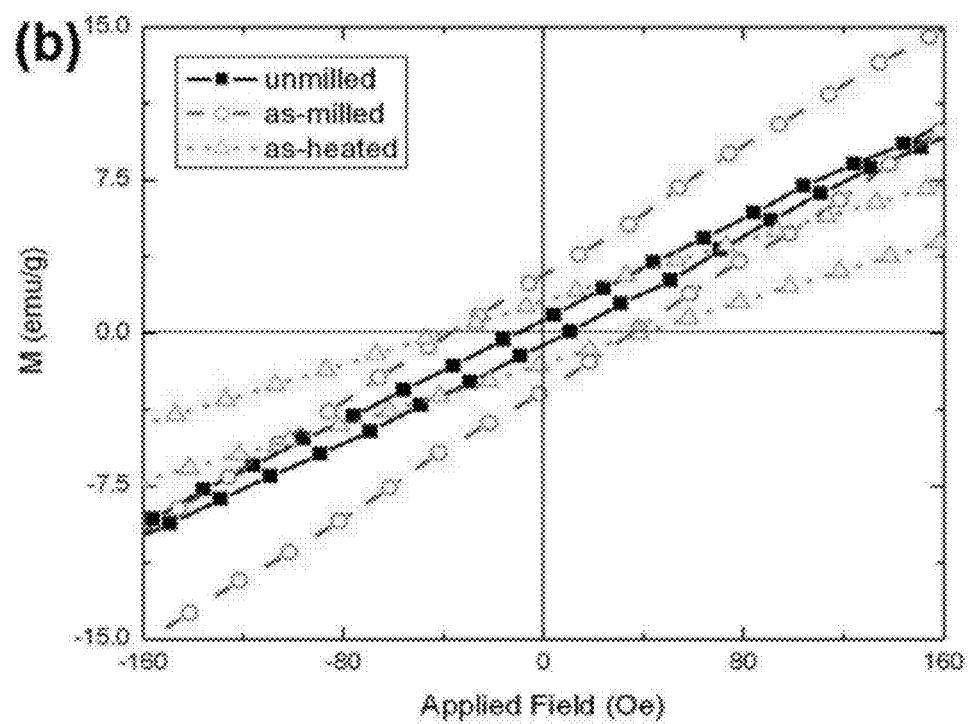

Hysteresis loops of the powders in various states are shown in FIG. 10. No appreciable difference is present between the hysteresis loop for the as-milled powders and that for the unmilled powders (FIG. 10a). This suggests that after 2 h milling, the Fe—Al powders were still ferromagnetic even though some Fe—Al b.c.c. solid solution formed. After application of the AMF, the saturation magnetization of the powders decreased significantly due to B2 ordering. B2-structured FeAl is paramagnetic at room temperature, but since the as-heated powders still appeared to be somewhat ferromagnetic there must be some residual Fe. This is in good agreement with the XRD observation (FIG. 8). The as-milled powders have the largest M-H loop area in the applied field (160 Oe), as shown in FIG. 10b, which means that they could produce substantial heating in an AMF.

Figure 11A:
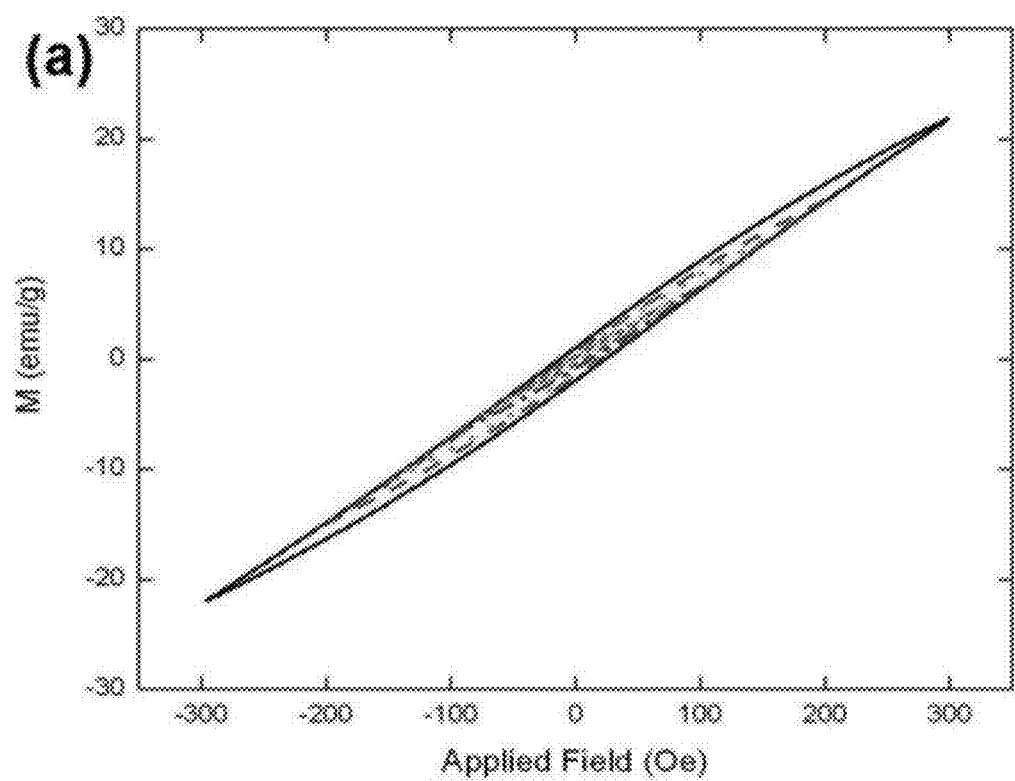
FIG. 11 shows (a) Hysteresis loops for the as-milled powders performed under different magnetic field amplitudes; (b) loop area dependence on the square of magnetic field amplitudes; (c) hysteresis loops for the as-milled powders performed in an AMF with different frequencies.
Figure 11B:
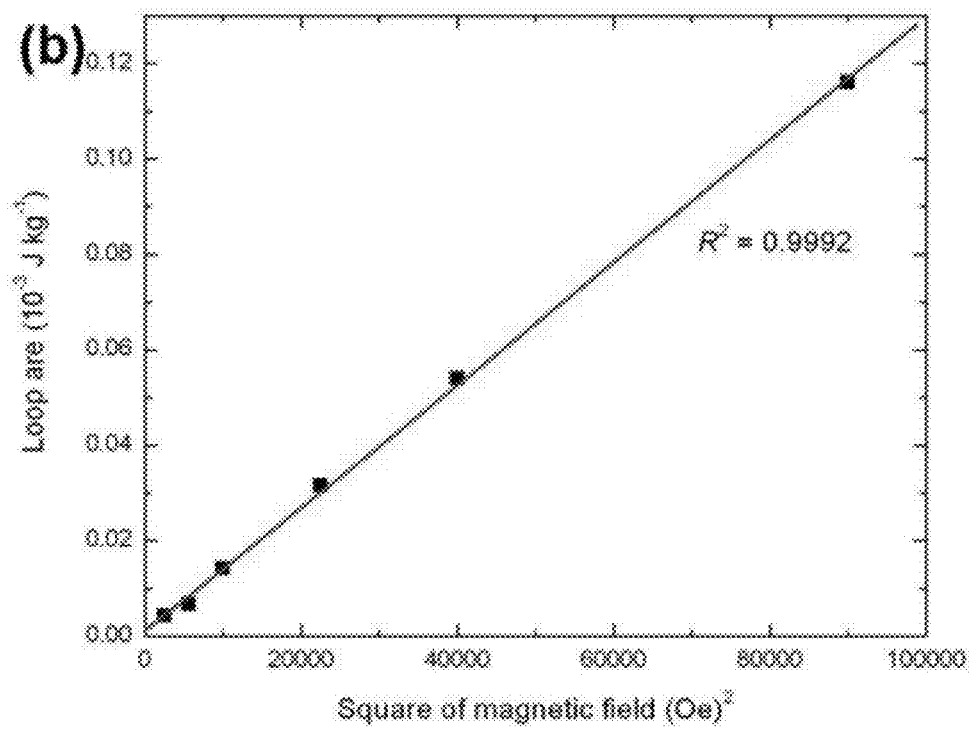
Figure 11C:
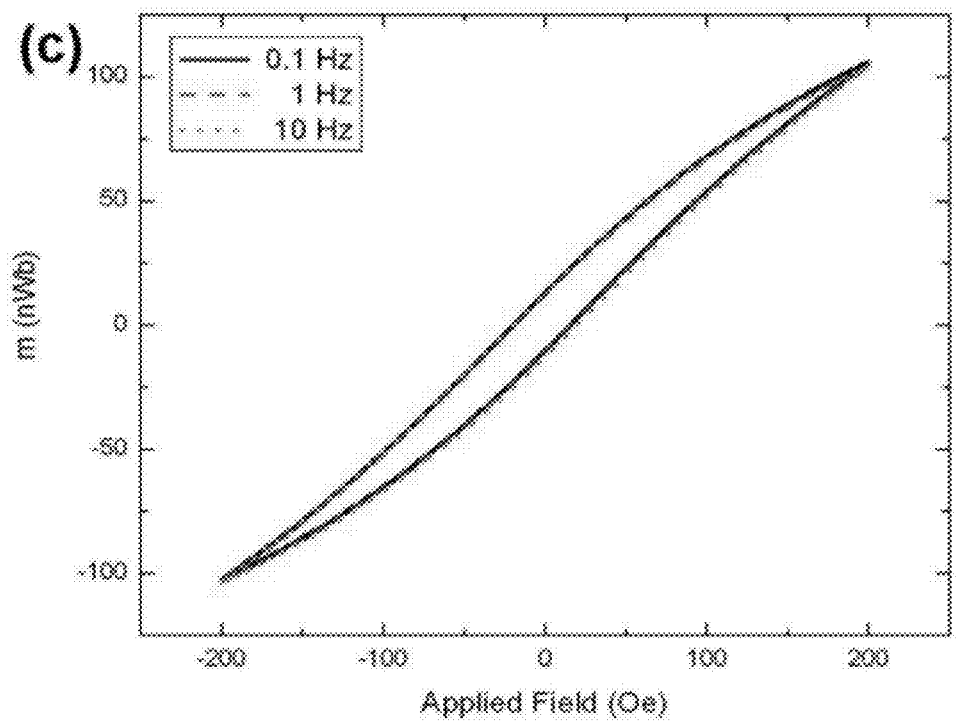

For hysteretic heating, the total power lost to heat is given by the frequency times the integral of the B-H curve over a closed loop. The series of hysteresis loops for as-milled powders shown in FIG. 11a demonstrate that the loop area (equal to power loss) increases significantly with increasing field amplitudes, implying that the higher magnetic field amplitude applied, the larger hysteresis heating induced. The plot of the loop area as a function of the square of magnetic field in FIG. 11b shows a clear linear dependence between the two parameters. In contrast, there is no noticeable difference in the hysteresis loops when the material was subjected to an AMF with frequencies in the range of 0.1-10 Hz (FIG. 11c). This indicates that the dynamic loss of the as-milled powders is independent of the frequency at those low frequencies. In general, the loss is a nonlinear function of frequency.

Figure 12A:
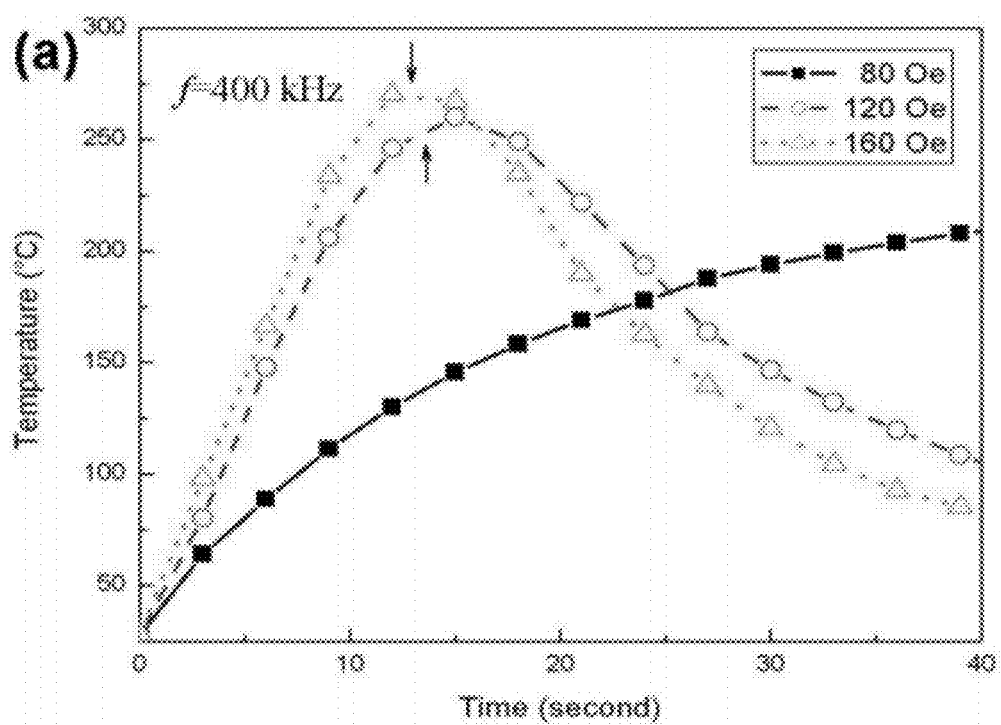
FIG. 12 shows temperature vs time curves of the as-milled specimen performed in the AMF at a frequency of 400 kHz with different magnetic field strengths (a) and in 160 Oe AMF at different frequencies (b). The arrows indicate when the field was turned off.
Figure 12B:
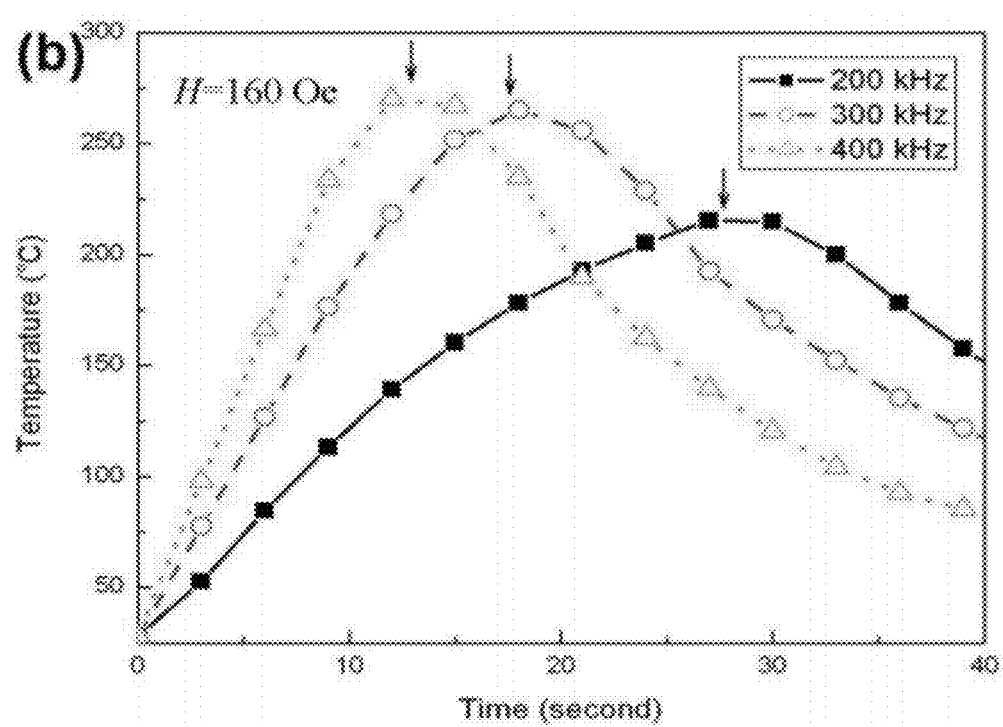

The observed heating effect is a result of absorbing energy from the AMF and transforming it into heat by means of the hysteresis loss during reversal of the magnetization. Plots of the temperature of the as-milled powders as a function of the time in the AMF with various field strengths and frequencies are shown in FIG. 12. In the early ascending part of the curves, the initial slope signifies the heating efficacy of the as-milled powders under different magnetic parameters. The descending part of the curves is due to the termination of the magnetic field. The heating rate (initial slope) increases monotonously with increases in both the magnetic field strength (FIG. 12a) and frequency (FIG. 12b).

The specific absorption rate (SAR) has been broadly used to evaluate the heating efficacy of nanoparticles for hyperthermia research. Here, the SAR was employed to evaluate the heating of the milled powders that arose from the hysteresis loss. The SAR is defined as the amount of heat released by a unit weight of the material per unit time, which can be calculated from:

$$SAR = c\Delta T/\Delta t \quad (1)$$

where c is sample-specific heat capacity, calculated as a mass-weighted mean value of magnetic carriers and equivalent medium, and $\Delta T/\Delta t$ is the temperature increase per time, i.e., the initial slope of the temperature versus time curve. In this work, since there is no other medium, the specific heat capacity of the powders was calculated from:

$$c = \frac{W_{Fe}c_{Fe} + W_{Al}c_{Al}}{W_{Fe} + W_{Al}} \quad (2)$$

where $W_i$ is the mass of Fe or Al.

Figure 13:
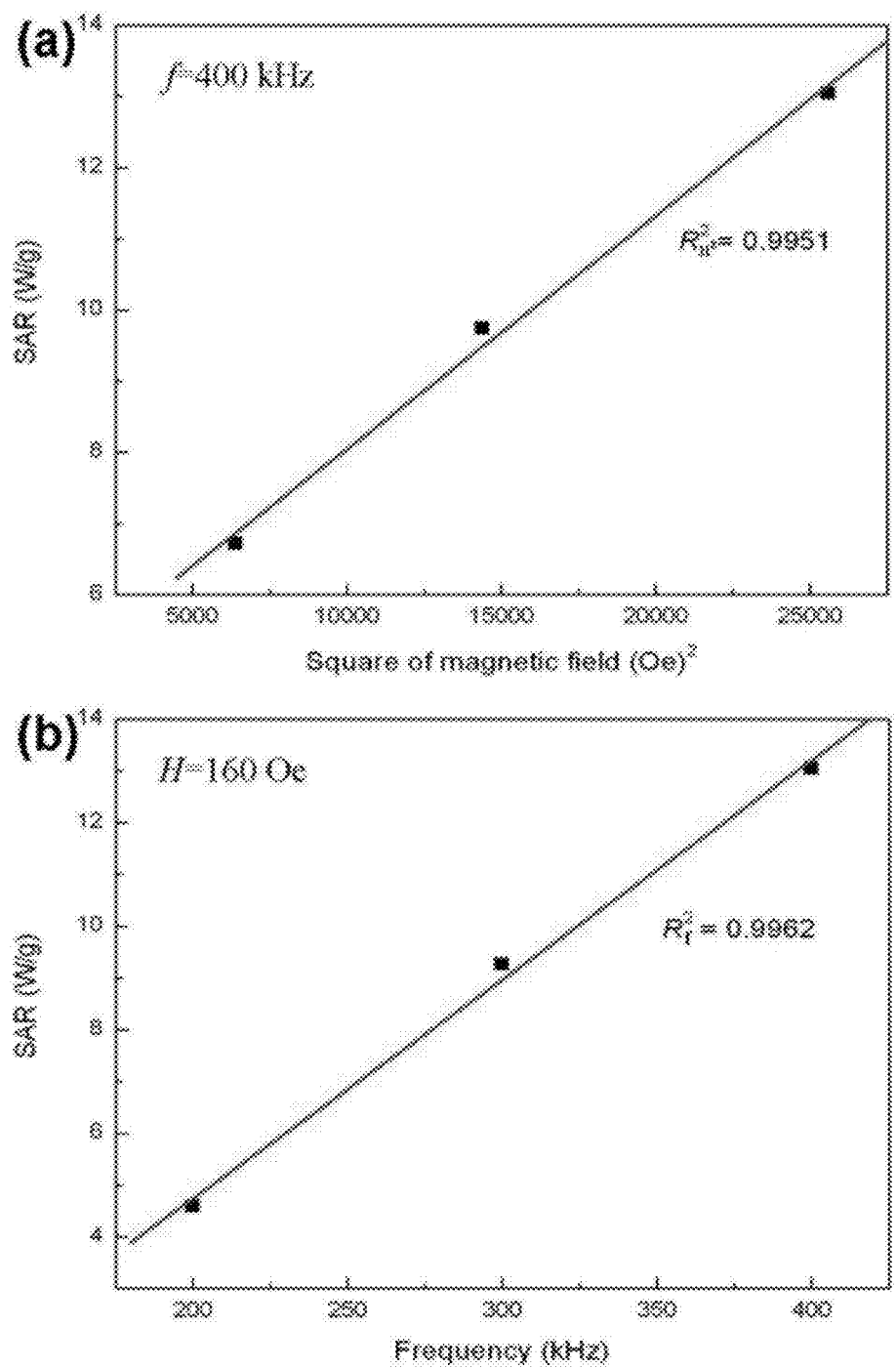
FIG. 13 shows (a) SAR vs square of magnetic field at 400 kHz and (b) frequency dependence of SAR at 160 Oe for the as-milled powders.

FIG. 13a shows the dependence of the SAR on the square of field amplitude for the as-milled powders at a frequency of 400 kHz. The SAR was found to increase linearly with the square of magnetic field amplitude. Interestingly, this is similar to the observations of the loop areas applied in various field amplitudes (FIG. 11b), suggesting an intrinsic correlation between the quasi-static loop area and the hysteresis heating, even if the dynamic magnetic behavior of the as-milled powders in the AMF is different. Furthermore, a linear dependence was also obtained between the SAR and the frequency for the as-milled powders (FIG. 13b). The well-fitted linear dependences ($R_{H^2}^2=0.9951$ and $R_f^2=0.9962$) indicate that these results are in good agreement with the established relationship:

$$SAR \approx k \times f^n \times H^2 \quad (3)$$

where k is a constant that depends on several factors (particle permeability, conductivity, size and shape, etc.), f is the frequency of the alternating magnetic field, n is an exponent (varies from 1 to 2), and H is the magnetic field strength.

Figure 14:
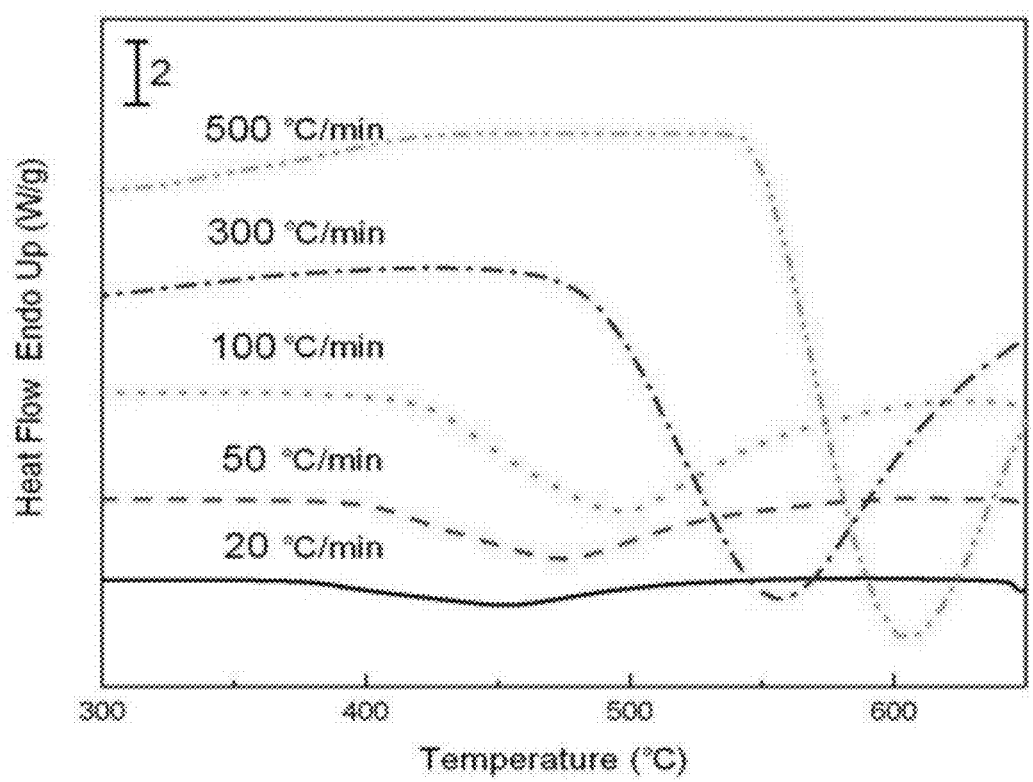
FIG. 14 shows DSC curves of as-milled powders at different heating rates.

DSC curves for as-milled powders at different heating rates are shown in FIG. 14. As the heating rate is increased, the exothermic peak corresponding to the formation of B2 FeAl shifts to higher temperatures.

In order to further understand the B2 ordering of the as-milled powders during heating, the activation energy of the exothermic reaction E was calculated using Kissinger's method (Kissinger, 1956):

$$\ln\left(\frac{T^2}{\beta}\right) = \frac{E}{RT} + C \quad (4)$$

where T is the onset exothermic reaction temperature, $\beta$ is the heating rate, E is the activation energy, R is the ideal gas constant and C is a constant.

Figure 15:
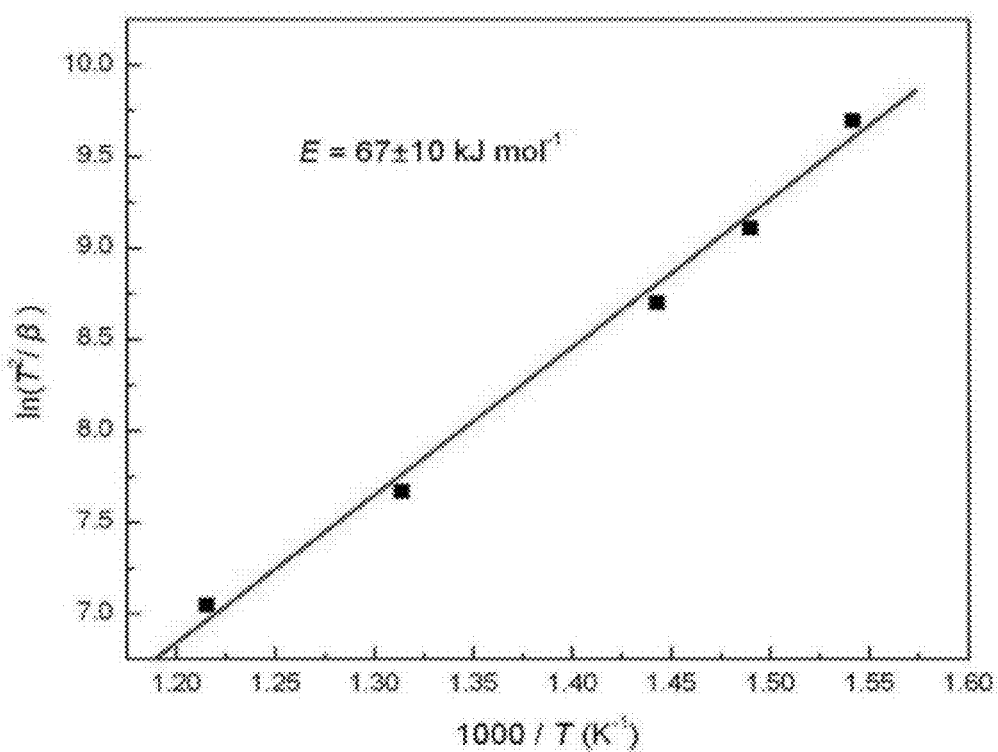
FIG. 15 shows the relation between the onset reaction temperatures and heating rates calculated using Kissinger's method.

A plot of $\ln(T^2/\beta)$ versus 1000/T based on the data from FIG. 14 is shown in FIG. 15. The activation energy associated with the formation of B2 phase can be obtained by a least-square fitting method using Eq. (4) to be 67±10 kJ mol$^{-1}$. This is considerably less than the activation energies for not only the annihilation of vacancies in B2 Fe-40 at % Al (133±2 kJ mol$^{-1}$), but also the annihilation of APB tubes from cold-rolled Fe-40 at % Al single crystals (101±9 kJ mol$^{-1}$). Besides, the APB tubes of FeAl single crystal annealed out at considerably lower temperature. The small activation energy presented here, therefore, suggests that the formation of B2 phase would be readily triggered upon heating.

The most common techniques for joining, brazing, soldering, and welding, involve heating and melting metals or alloys at a seam or junction where two or more components are to be joined. However, these techniques have the disadvantage for some materials that more than just the interface is heated, which can lead to dimensional distortion and changes in physical or mechanical properties. Wang et al. demonstrated a method of room-temperature soldering using reactive Ni/Al nanostructured multilayer foils and found that the shear strength of the joints formed using the method were higher than that of conventional solder joints. See Wang J. et al., Appl Phys Lett 2003; 83:3987-9. Similarly, melting was reported in the explosive reactions of Ni/Al multilayer films with an appropriate atomic ratio of Ni and Al by Ma et al., Appl Phys Lett 1990; 57:1262-4.

In this example, it is shown that when elemental powders of Fe and Al (3:2 atomic ratio) with a particle size of ~10 μm were milled for 1-2 h, they were susceptible to heating in an AMF and underwent a substantial heat output (18-21 kJ mol$^{-1}$) around 400° C. The large heat output from the formation of the B2 FeAl, combined with the small activation energy, could be utilized to not only join similar or dissimilar materials by means of either melting themselves (as indicated in FIG. 6a) or heating a joining layer, but also avoids heating whole joining parts. Moreover, compared with the Ni/Al multilayer foils, the milled Fe—Al powders have a number of advantages. First, the production costs of the Fe—Al powders are considerably lower than that of the Ni/Al multilayer foils. Second, the magnetic heating approach means that the interface does not have to be easily accessible since an AMF of an appropriate frequency can penetrate many materials. Third, the NiAl compound formed after heating is brittle, while Fe—Al alloy shows some ductility at room temperature. Fourth, the powders can be used to join non-planar interfaces, which is not easily done with the Ni/Al multilayer foils. In addition, it is worth noting that the heating of the Fe—Al powders subjected to an AMF is mostly related to the magnetic hysteresis loss, and potential eddy current loss could be neglected since the powders with a micron-scale particle size are physically separated and/or coated with a surface oxide introduced by ball-milling that prevents current flow between particles. Consequently, the potential reheating of the joints can be avoided due to the paramagnetism of the B2-structured FeAl formed after heating when subject to an AMF again.

Powders of Fe—Al (3:2 atomic ratio) were mechanically milled and subsequently subjected to AMF to evaluate their heating efficacy. The as-milled powders with a fine intermixed-layer structure were susceptible to heating in the AMF, and underwent a significant heat output (21 kJ mol$^{-1}$) around 400° C. due to the reaction between Fe and Al to form B2-structured FeAl. The temperature increase depended on both the square of field strength and the frequency of the AMF. The activation energy for the formation of B2-structured FeAl compound was 67±10 kJ mol$^{-1}$, as calculated by Kissinger's method.

It is to be understood that various changes and modifications may be made to the disclosed embodiments that are well within the scope of the present compositions and methods. Numerous changes may be made which will readily suggest themselves to those skilled in the art and which are encompassed in the spirit of the compositions and methods disclosed herein and as defined in the appended claims.

All patents, patent applications and publications mentioned in this application are incorporated by reference in their entirety.

LIST OF REFERENCES

The following references are either cited in this disclosure or are of relevance to the present disclosure. All documents listed below, along with other publications, patents and publication of patent applications cited throughout this disclosures, are hereby incorporated by reference as if the full contents are reproduced herein.

Liu C T, George E P, Maziasz P J, Schneibel J H. Mat Sci Eng A 1998; 258:84-98.
Deevi S C, Sikka V K, Liu C T. Prog Mater Sci 1997; 42:177.
Deevi S C, Sikka V K. Intermetallics 1996; 4:357.
McKamey C G, Devan J H, Tortorelli P F, Sikka V K. J Mater Res 1991; 6:695.
Baker I. Scripta Mater 1999; 41:409-14.
Morris D G, Munoz-Morris M A, Chao J. Intermetallics 2004; 12:821-6.
Gleiter H. Prog Mater Sci 1991; 33:223.
Koch C C. Mater Sci Forum 1992; 243:88.
Krasnowski M, Kulik T. Intermetallics 2007; 15:201-5.
Tcherdyntsev V V, Kaloshkin S D, Shelekhov E V, Salimon A I, Sartori S, Principi G. Intermetallics 2005; 13:841-7.
Lee P Y, Kao M C, Lin C K, Huang J C. Intermetallics 2006; 14:994-9.
Koch C C, Whittenberger J D. Intermetallics 1996; 4:339-55.
Zeng Q, Baker I. Intermetallics 2006; 14:396-405.
Huang B, Ishihara K N, Shingu P H. Mater Sci Eng A 1997; 231:72-9.
Wolski K, Le Caer G L, Delcroix P, Fillit R, Thevenot F, Le Coze J. Mater Sci Eng A 1996; 207:97-104.
Eelman D A, Dahn J R, Mackay G R, Dunlap R A. J Alloys Compd 1998; 266:234-40.
Varin R A, Czujko T, Bystrzycki J, Calka A. Mater Sci Eng A 2002; 329-331:213-21.
Hernando A, Amils X, Nogues J, Surinach S, Baro M D, Ibarra M R. Phys Rev B 1998; 58:864-7.
Negri D, Yavari A R, Deriu A. Acta Mater 1999; 47:4545-54.
Gialanella S, Amils X, Baro M D, Delcroix P, Le Caer G, Lutterotti L, Surinach S. Acta Mater 1998; 46:3305-16.
Amils X, Nogues J, Surinach S, Munoz J S, Lutterotti L, Gialanella S, Baro M D. Nanostruct Mater 1999; 11:689-95.
Apinaniz E, Garitaonandia J S, Plazaola F. J Non-Cryst Solids 2001; 287:302-7.
Wang J, Besnoin E, Duckham A, Spey S J, Reiss M E, Powers M, Whitener M, Weihs T P. Appl Phys Lett 2003; 83:3987-9.
Swiston Jr A J, Hufnagel T C, Weihs T P. Scripta Mater 2003; 48:1575-80.
Duckham A, Spey S J, Wang J, Reiss M E, Weihs T P, Besnoin E, Knio O M. J Appl Phys 2004; 96:2336-42.
Baker I, Zeng Q, Li W, Sullivan C R. J Appl Phys 2006; 99:08 H106.
Oleson J R, Calderwood S K, Coughlin C T, Dewhirst M W, Gerweck L E, Gibbs F A, Kapp D S. Am J Clin Oncol 1988; 11:368-80.
Wang X, Gu H, Yang Z. J Magn Magn Mater 2005; 293:334-40.
Chou C K. Int J Hyperthermia 1990; 6:367-70.
Lao L L, Ramanujan R V. J Mater Sci: Mater Med 2004; 15:1061-4.
Jordan A, Scholz R, Wust P, Fahling H, Felix R. J Magn Magn Mater 1999; 201:413-9.
Xiao H and Baker I. *Acta Metall Mater* 1995; 43:391-396.
Rzyman K, Moser Z, Miodownik A P, Kaufman L, Watson R E, Weinert M. Calphad 2000; 24:309-18.
Zhang X K, Li Y F, Xiao J Q. J Applied Phys 2003; 93:7124.
Bertotti G. I EE E Trans Magn 1988; 24:621-30.
Kissinger H E. J Res Natl Bur Stand 1956; 57:217-21.
Riviere J P, Zonon H, Grilhe J. Phys Stat Sol A 1973; 16:545-52.
Wu D, Baker I. Phil Mag A 2002; 82:2239-47.
Ma E, Thompson C V, Clevenger L A, Tu K N. Appl Phys Lett 1990; 57:1262-4.
Baker I, Munroe P R. Int Mater Rev 1997; 42:181-205.

What is claimed is:

1. A product comprising at least two parts, said at least two parts being joined together using a joining method, said joining method comprising
(a) dispersing a joining material at an interface between said at least two parts, wherein said joining material comprises a metal-aluminum powder; and
(b) applying an alternating magnetic field (AMF) having a magnetic field strength and frequency that induce magnetic hysteresis losses in said metal-aluminum powder for a period that raises the temperature of said metal-aluminum powder to an exothermic transformation temperature, (c) allowing said metal-aluminum powder to melt and resolidify as a metal aluminide solid, thereby joining said at least two part, wherein said metal aluminide solid has a non-magnetic configuration.

2. The product of claim 1, wherein the joining material is a microcrystalline material.

3. The product of claim 1, wherein the joining material is a nanocrystalline material.

4. The product of claim 1, wherein particles of the metal-aluminum powder have diameters of between 1 µm and 25 µm.

5. The product of claim 1, wherein the metal aluminide is according to a formula:

$$(x)M\text{-}(y)Al,$$

wherein M is a metal or combination of metals selected from Fe, Ni and Co;
x ranges from 55 to 80 atomic percent; and
y ranges from 20 to 45 atomic percent.

6. A method for joining at least two parts to make the product of claim 1, said method comprising:
dispersing a joining material comprising a metal-aluminum powder at an interface between said at least two parts to be joined; and
applying an alternating magnetic field (AMF) having a magnetic field strength and frequency that induce magnetic hysteresis losses in the metal-aluminum powder for a period that raises the temperature of the metal-aluminum powder to an exothermic transformation temperature where the metal-aluminum powder melts and resolidifies as a metal aluminide solid having a non-magnetic configuration.

7. The method of claim 6, wherein the joining material further comprises a solder.

8. The method of claim 6, wherein the joining material is disposed within a polymer.

9. The method of claim 6, wherein the joining material is disposed within a slurry.

10. The method of claim 6, wherein the AMF has a magnetic field strength ranging from 50 Oe to 2000 Oe.

11. The method of claim 6, wherein the AMF has a frequency ranging from 25 KHz to 100 MHz.

12. The method of claim 6, wherein the period is in a range between 5 seconds and 100 seconds.

13. The method of claim 6, wherein the at least two parts are joined at a non-planar interface.

14. The method of claim 6, wherein the non-magnetic configuration of the metal aluminide is a B2 structure.

15. The method of claim 6, wherein the metal aluminide is according to a formula:

$$(x)M\text{-}(y)Al,$$

wherein M is a metal or combination of metals selected from Fe, Ni and Co;
x ranges from 55 to 80 atomic percent; and
y ranges from 20 to 45 atomic percent.

16. The method of claim 15, wherein x is 60 atomic percent and y is 40 atomic percent.

17. The method of claim 6, wherein the metal aluminide is selected from the group consisting of iron aluminide, nickel aluminide, cobalt aluminide, ternary intermetallic compounds comprising Al and two metals selected from Fe, Ni and Co, quaternary intermetallic compounds comprising Fe, Ni, Co and Al, and physical mixtures thereof.

18. The method of claim 6, wherein the metal aluminide is iron aluminide.

19. The method of claim 18, wherein the iron aluminide comprises 60 atomic percent iron and 40 atomic percent aluminum.

20. The method of claim 6, wherein the at least two parts form a combination selected from polymer-polymer, semiconductor-semiconductor, ceramic-ceramic, polymer-metal, polymer-semiconductor, polymer-ceramic, metal-semiconductor, metal-ceramic and semiconductor-ceramic.

21. The method of claim 6, wherein the at least two parts form a combination selected from semiconductor-semiconductor, ceramic-ceramic, metal-semiconductor, metal-ceramic and semiconductor-ceramic.

22. The method of claim 6, wherein the at least two parts form a combination selected from ceramic-ceramic and metal-ceramic.

23. The method of claim 6, wherein particles of the metal-aluminum powder have diameters of between 6 µm and 25 µm.

24. The method of claim 6, wherein particles of the metal-aluminum powder have diameters between 5 µm and 10 µm.

25. The method of claim 6, wherein the step of dispersing comprises painting, silk screening or dipping.

26. The method of claim 6, wherein the joining material is a microcrystalline material.

* * * * *